(12) United States Patent
Martinez (10) Patent No.: US 6,463,388 B1
(45) Date of Patent: Oct. 8, 2002

(54) METHOD AND SYSTEM FOR ATTENUATION OF ACQUISITION GEOMETRY IMPRINT IN SEISMIC DATA

(75) Inventor: Ruben Martinez, Sugarland, TX (US)

(73) Assignee: PGS Americas, Inc., Houston, TX (US)

( * ) Notice: Subject to any disclaimer, the term of this patent is extended or adjusted under 35 U.S.C. 154(b) by 175 days.

(21) Appl. No.: 09/658,057

(22) Filed: Sep. 8, 2000

(51) Int. Cl.$^7$ ................................................ G01V 1/28
(52) U.S. Cl. ..................................................... 702/17
(58) Field of Search ............................ 702/14, 16, 17; 367/73

(56) References Cited

U.S. PATENT DOCUMENTS

| | | |
|---|---|---|
| 3,398,396 A | 8/1968 | Embree |
| 6,151,555 A * | 11/2000 | Van Bemmel et al. ........ 702/14 |
| 6,343,256 B1 * | 1/2002 | Winbow et al. .............. 702/17 |

OTHER PUBLICATIONS

Gulunay, et al., "*3D Data Acquisition Artifacts Removal—Spot Editing in the Spatial–Temporal Frequency Domain*", 56$^{th}$ Meeting and Technical Exhibition, Vienna, Austria, Jun. 6–10, 1994.

Hill, et al., "*Acquisition Footprint and fold–of–stack plots*", The Leading Edge, Jun. 1999, pp. 686–695.

* cited by examiner

*Primary Examiner*—Donald E. McElheny, Jr.

(57) ABSTRACT

A method is disclosed for attenuating acquisition geometry imprint in seismic data. The method includes raising amplitudes of the data to a predetermined power, calculating weights, selecting a time slice of the seismic data and the weights, scaling the data with the weights, stacking the scaled data, stacking the weights, and dividing the stacked scaled data by the stacked weights.

74 Claims, 8 Drawing Sheets

METHOD AND SYSTEM FOR ATTENUATION OF ACQUISITION GEOMETRY IMPRINT IN SEISMIC DATA

BACKGROUND OF THE INVENTION

As it is well known, seismic amplitudes have been traditionally used to identify and quantify lithology and fluid types present in the subsurface. This reduces the overall risk in the hydrocarbon exploration and exploitation stages. Post stacked seismic data often show amplitude patterns that resemble the acquisition geometry. This is commonly referred to as "Acquisition Geometry Imprint (AGI)." One example where such patterns are often very noticeable is in time sliced data. These amplitude distortions can limit the value of the seismic amplitudes in applications such as hydrocarbon reservoir characterization and monitoring.

More specifically, the AGI distortion originates when seismic data is acquired with variable offsets, fold, and/or azimuth distributions. When the offset, fold, and/or azimuth distribution is not uniform, steeply dipping residual coherent noise or residual multiple reflections, or any other seismic interference, will intercept the primary reflections at different offsets and/or azimuths having an effect in the stack response. This effect causes the stack to produce spatial periodic variations in the stacked amplitude, thus resulting in organized spatial amplitude distortions that can mimic the field geometry (Gulunay et al. 1994), incorporated herein by reference. Thus, this acquisition geometry imprint creates a systematic distortion in the seismic data. This phenomenon is observed more clearly as high or low amplitude bands or strips in time slices taken from three dimensional stacked seismic data volumes. As mentioned earlier, this spurious energy masks the true relative amplitudes that are useful for interpretation purposes.

For all these reasons, the attenuation of the AGI effect is vital to provide high fidelity amplitudes after data processing. The impact of this correction is important because it affects the accuracy of the characterization and monitoring of hydrocarbon reservoirs. There is a long felt need for a method of attenuating the acquisition geometry imprint.

SUMMARY OF THE INVENTION

The present invention provides a method and system for attenuation of acquisition geometry imprint in seismic data. The method of one embodiment of the present invention includes receiving seismic data. In one example embodiment, this data is in the form of common midpoint (CMP) gathers with normal moveout correction (NMO) applied. In this example, the CMP gathers contain the data in the time-offset-azimuth domain. The amplitudes of the seismic data are raised to a predetermined power. The reciprocal of the raised amplitude data is computed to produce weights. A time slice across a CMP gather of the weights is selected, and the weights of the time slice are stacked. The original input amplitudes are scaled using the weights and stacked. The stacked scaled weighted amplitudes are divided by the stacked weights to produce the output amplitudes.

In another embodiment of the present invention, the amplitudes of seismic data with the normal moveout correction (NMO) applied are squared. The squared amplitude data is then inverted to produce weights. A time slice of the weights and seismic data is selected, and the amplitudes of the time slice of the inverted data are divided into sets. In each of the sets, the inverted data is multiplied by the raw amplitudes to obtain the scaled data. The scaled data is stacked, and the weights are also stacked. Next, a model amplitude corresponding to each set is developed and centered at the middle of the minimum and maximum offset in each set of amplitudes. The representative offset values for each set are transformed, and a parabola is fitted to the transformed representative offset values for each set. The originally received offsets of the received seismic data are then transformed. Model amplitudes are computed at all the originally received transformed offsets, and the model amplitudes are compared to the real amplitudes and a difference value is calculated. If the difference value exceeds a predetermined threshold, the real amplitudes are scaled to match the model amplitudes, and the scaled amplitudes are used to produce a new parabolic model of scaled amplitudes across the time slice for the second time. The parabolic model of the amplitudes is used to predict the output amplitude at zero offset for the current time slice. Then, the process continues to the next time slice until the maximum recorded time is reached.

DESCRIPTION OF THE EXAMPLE EMBODIMENTS OF THE INVENTION

In various embodiments of the present invention, a method and system for attenuating the acquisition geometry imprint is provided. Example embodiments of the present invention is compared with FIG. 1 for a more complete understanding of the present invention. In one embodiment, at block 12 seismic data is received. In one example embodiment, a common midpoint (CMP) gather of seismic data corrected by normal moveout (NMO) is received. Of course, in alternate embodiments other types of gathers will be used. Such alternate gathers are shot gathers, receiver gathers, and any other gather as will occur to one of ordinary skill in the art.

Figure 1:
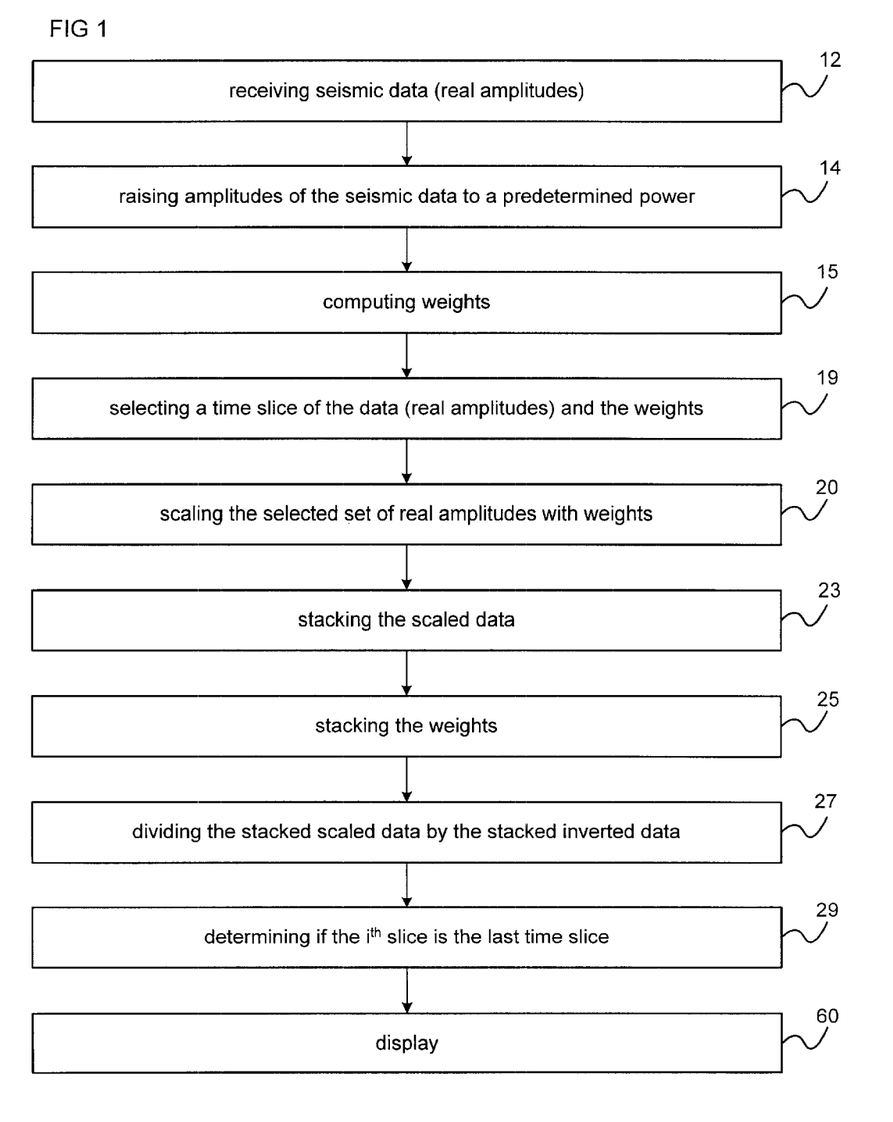
FIG. 1 is a block diagram of one embodiment of a method of the present invention.

In a CMP example embodiment, at a given time, all amplitudes across all offsets are considered to produce the zero offset amplitude. In alternate embodiments, a subset of all amplitudes and all offsets is considered. In block 14 the input real amplitude traces are converted to the $n^{th}$ power values by raising the real amplitudes to the $n^{th}$ power. The $n^{th}$ power is any power that produces workable data. Typically, the $n^{th}$ power is either the first or the second power. In other words, the amplitudes are either kept the same or squared. Of course, in alternate embodiments, the amplitudes are raised 14 to any other power which will occur to one of ordinary skill in the art.

Next, in one embodiment, $n^{th}$ power traces are then inverted 15 to obtain the weights w. In further embodiments, weights w are created by fixing n=1 or 2, or any other number that produces workable data. In further embodiments, weights w are provided manually. In alternate embodiments, the inverted $n^{th}$ power values or the weights, or both are then smoothed in time. In an even further embodiment, the weights data are smoothed with a filter. In various embodiments, this filter is a Boxcar, Bartlett, Gaussian, or other type of filter that will occur to those of skill in the art. In some embodiments, this filter will have a predefined length. Of course, in even further embodiments, other methods of smoothing the data such as polynomial fitting, splines, digital bandpass filters, or any other method that will occur to those of ordinary skill in the art used.

At block 19, a time slice of the seismic data (real amplitudes) and the inverted data (weights) is selected. The selected amplitudes are scaled 20 with the inverted data. The scaled data is stacked 23. The weights are stacked 25. The stacked, scaled data is divided 27 by the stacked weights (inverted data). In one embodiment, this is accomplished by an inverse $n^{th}$ power weighted stack:

$$S_w = \frac{\sum_i a_i \cdot w_i}{\sum_i w_i}; w_i = \frac{1}{a_i^n}; i = 1, 2, \ldots m$$

where:
 m=total number of offsets,
 a=input real amplitudes,
 w=inverse $n^{th}$ power weights,
 i=$i^{th}$ sample,
 n=$n^{th}$ power.

In this embodiment, the resulting amplitude $S_w$, is the estimated amplitude at zero offset with the AGI distortion attenuated. In alternate embodiments, various methods of stacking are used. Examples of such alternate methods are median stack, trimmed stack, or any other method of stacking that will occur to one of ordinary skill in the art.

In a further embodiment, at block 29 the data is reviewed to determine if the time slice being considered is the $i^{th}$ time slice or the last time slice. If it is the last time slice, in an even further embodiment, the data may be displayed at block 60. To determine if this is the last time slice, the time of the time slice is compared with the maximum recording time. If the time of the time slice is not the last time slice, the process returns to block 19, a new time slice is selected, and real amplitudes are scaled with inverted data at block 20. The process is repeated for the next time slice in the gather. In an even further embodiment, once it is determined that the time slice is acceptable, it is displayed 60. Various methods of displaying data are on paper, on the screen or a monitor, or any other method that will occur to one of ordinary skill in the art.

Figure 2A:
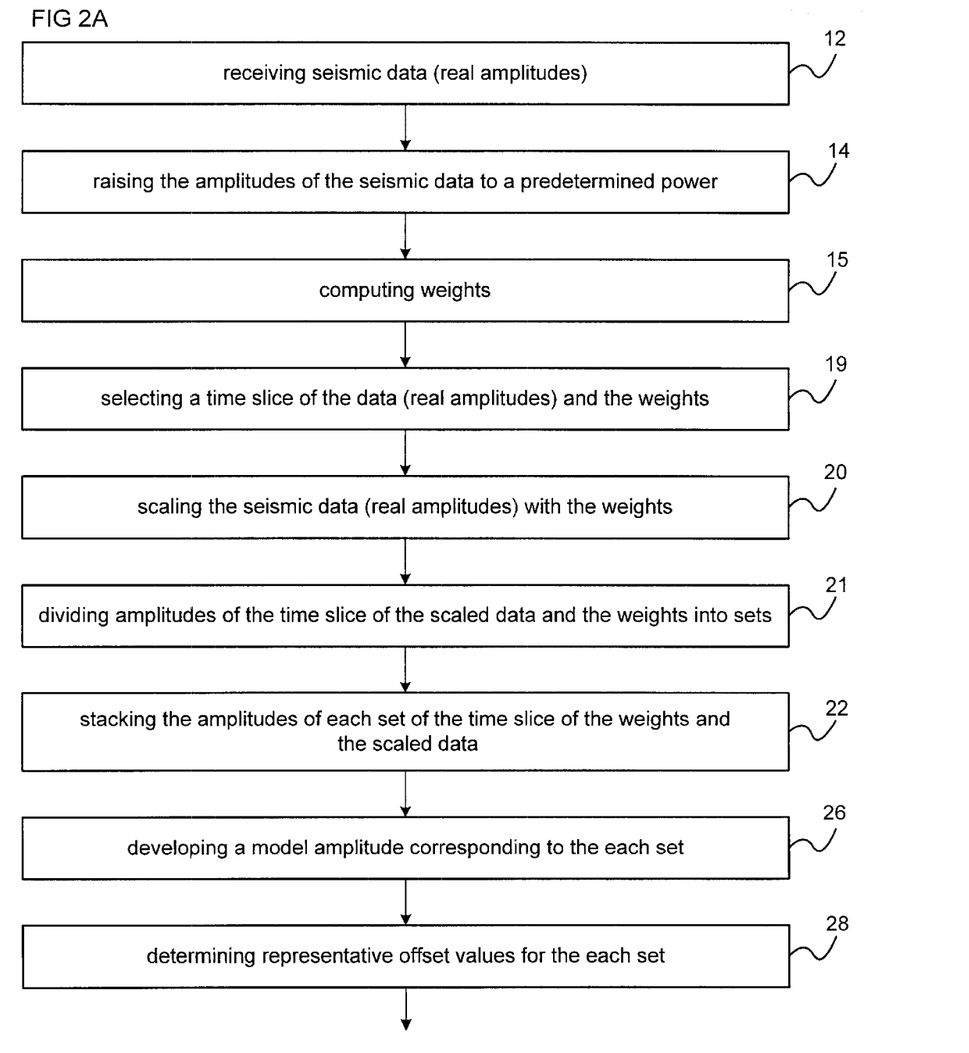
FIGS. 2A, 2B, and 2C are a block diagram of another embodiment of a method of the present invention.
Figure 2B:
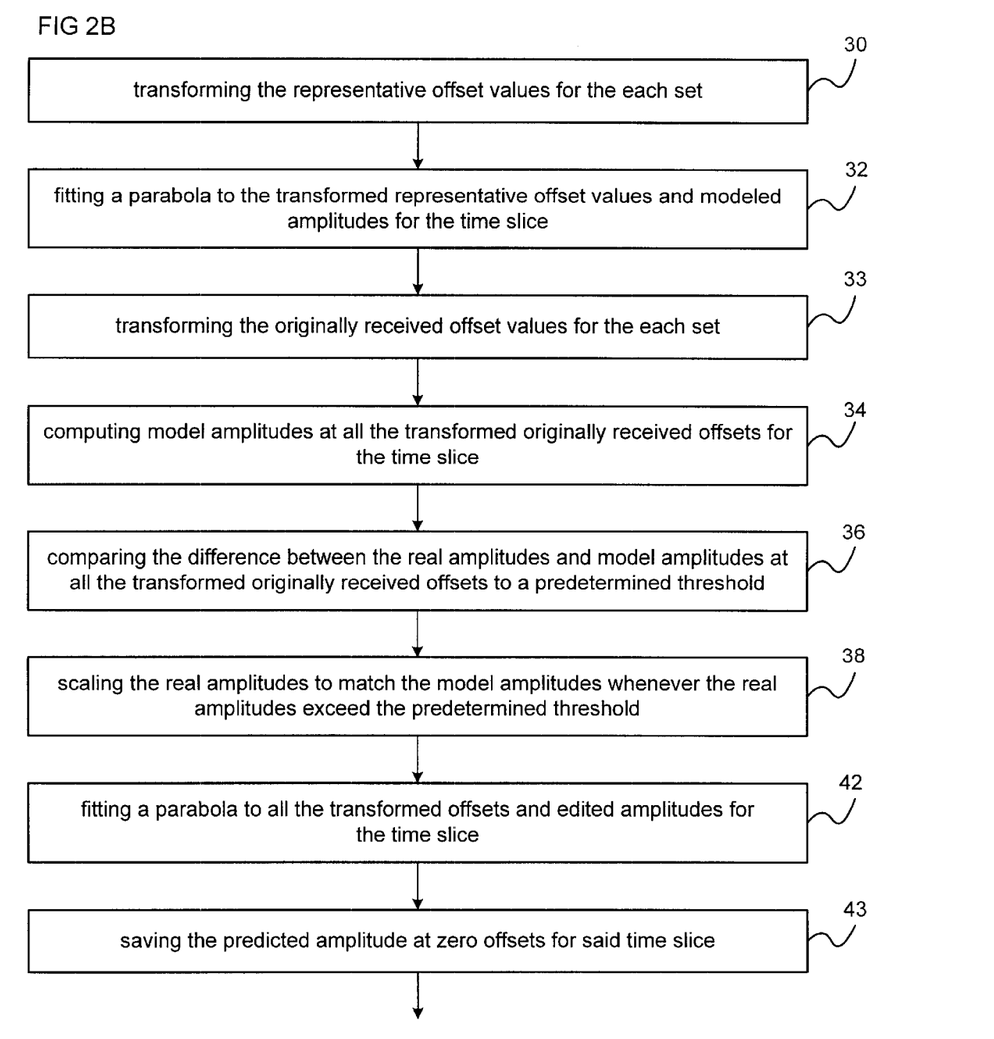
Figure 2C:
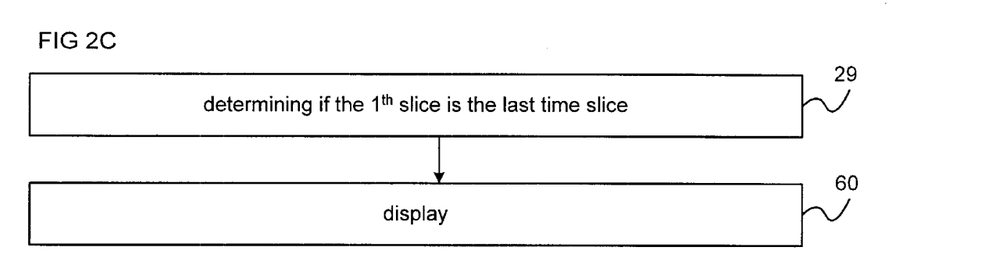

Referring now to FIG. 2, an even further embodiment of the present invention is illustrated in flow chart form. At block 12, seismic data is received. This seismic data maybe in various forms, for example, in common midpoint gathers or in any other form that would occur to one of ordinary skill in the art. At block 14, the amplitudes of the data are raised to a predetermined power ($n^{th}$ power), where n is any number. Typically, in alternate embodiments, n is 1 or 2.

In alternate embodiments, the $n^{th}$ power values are then smoothed when needed. In various embodiments, the smoothing is accomplished with a filter such as a Boxcar, Bartlett, Gaussian, or other filter that will occur to those of skill in the art. In some embodiments, this filter has a predefined length. Of course, in some embodiments, such smoothing is not needed. In even further embodiments smoothing is accomplished by polynomial fitting, spline fitting, bandpass filters, or any other method that will occur to those skilled in the art.

In an even further embodiment, illustrated in FIG. 2, the $n^{th}$ power values are inverted at block 15 to obtain weights w. Of course, in alternate embodiments, weights w are created by fixing n=1 or 2 or any other number which produces workable data, or the weights can be provided manually, or any other method that will occur to those of ordinary skill in the art. In a further embodiment, at block 19 a time slice of the inverted data (weights) and real amplitudes is selected. At block 20, the seismic data (real amplitudes) are scaled with the weights. In an even further embodiment, at block 21, the scaled data and the inverted data (weights) of the time slice are divided into sets. The number of sets may be any number that produces workable numbers. In one acceptable example embodiment, the amplitudes are divided into three equal sets. Since the number of amplitudes are not always a multiple of three, for example, the three sets may not always contain exactly the same number of amplitudes. In other embodiments, a different number of sets will be used as will occur to those of ordinary skill in the art.

In still a further embodiment, at block 22, the amplitudes of each set of the inverted data (weights) and scaled data are stacked for a given set and time slice. In an even further embodiment, at block 26, model amplitudes corresponding to each set are developed. The model amplitudes are developed by first performing an inverse power weighted stack on each set. An inverse $n^{th}$ power weighted stack is performed on the three amplitude sets, one set at a time, using the following equation.

$$S_w = \frac{\sum_i a_i \cdot w_i}{\sum_i w_i}; w_i = \frac{1}{a_i^n}; i = 1, 2, \ldots m$$

where:
 m=the total number of offsets,
 a=input real amplitudes,
 w=inverse power weights,
 $S_w$=inverse power weighted stack, and
 i=$i^{th}$ sample.
 n=$n^{th}$ power.

Of course, any other method of stacking such as median stack, and trimmed stack, to name just a few, will occur to those of ordinary skill in the art. Next, each of the three stacks is centered at the middle of the minimum and maximum offset in each set of amplitudes. The results are three model amplitudes for each time slice.

In a further embodiment, at block 28, representative offset values are determined for each set. The three model amplitudes, for example, S1, S2, and S3, have three corresponding representative offsets, $x_1$, $x_2$, and $x_3$, respectively. These offsets are centered at each selected amplitude set. For example, in some embodiments, each representative offset value is the average of the minimum and maximum offsets in the selected set.

In still an even further embodiment, at block 30, the representative offsets are transformed to the sine square of the angle of incidence domain using the offset value (x), the normal incidence travel time ($t_0$), and the average or root mean square (RMS) velocity (V) to $t_0$, by the following relationship:

$$\sin^2(\theta) = \sin^2\left[\arctan\left(\frac{x}{t_0 \cdot V}\right)\right]$$

Of course, in alternate embodiments, representative offsets are transformed to the square offsets, square tangents of the angle of incidence, or any other domain which will occur to those of ordinary skill in the art.

In still a further embodiment, at block 32, a parabola is fitted to the model amplitudes. Using the three model amplitudes a parabola is fitted 32 versus the $\sin^2(\theta)$. The parabolic model is characterized by the following equation:

$$s(\theta) = b_0 + b_1 \sin^2 \theta + b_2 \sin^4 \theta$$

The parabolic fitting produces three coefficients: $b_0$, $b_1$, and $b_2$. Of course, in an even further embodiment, any other coefficients produced from a different shaped fitting are used.

In still an even further embodiment, at block 33, the originally received offsets of the received seismic data are transformed to the sine square of the angle of incidence domain using the offset value (x), the normal incidence travel time ($t_0$), and the average or root mean square (RMS) velocity (V) to $t_0$, by the following relationship:

$$\sin^2(\theta) = \sin^2\left[\arctan\left(\frac{x}{t_0 \cdot V}\right)\right]$$

Of course, in alternate embodiments, originally received offsets are transformed to the square offsets, square tangents of the angle of incidence, or any other domain which will occur to those of ordinary skill in the art.

In a further embodiment, at block 34, model amplitudes are now computed at all the transformed originally received offsets for the time slice. Using the coefficients previously computed, model amplitudes at every offset transformed to $\sin^2 \theta$ along the time slice are computed and compared to the real amplitudes at the same offsets transformed to $\sin^2 \theta$. In an even further embodiment, any other amplitude may be computed and compared as will occur to those of ordinary skill in the art.

In an even further embodiment, at block 36, the difference between the model amplitudes at the transformed originally received offsets and the real amplitudes at the same offset are checked against a predetermined threshold value. If the difference exceeds such threshold value, then the current real amplitude is scaled to match that of the modeled amplitude at block 38 creating edited real amplitudes. The real amplitudes exceeding the threshold value at this point could have been the cause of AGI distortion. In various alternate embodiments, the predetermined threshold is chosen a priori, as a percent of total amplitude, a measure in decibels, or any other predetermined threshold that will occur to those of ordinary skill in the art. The amplitudes are then saved.

In further embodiments, at block 42, the edited real amplitudes at all offsets are used to perform another parabolic model corresponding to the following equation:

$$s'(\theta) = b'_0 + b'_1 \sin^2 \theta + b'_2 \sin^4 \theta$$

The result will be a new set of coefficients which are denominated $b'_0$, $b'_1$, and $b'_2$. In an even further embodiment, the amplitude corresponding to the coefficient value $b'_0$ is the zero offset or predicted amplitude at zero offset without the AGI effect. In a further embodiment, at block 43, the predicted amplitude at zero offset ($b'_0$) is saved for the time slice.

In an even further embodiment, the processed data is reviewed to determine 29 if the time slice being considered is the $i^{th}$ time slice or the last time slice. If the time slice is not the last time slice, the process returns to block 19 and a new time slice is selected. If it is the last time slice, the data may be displayed 60.

Figure 3:
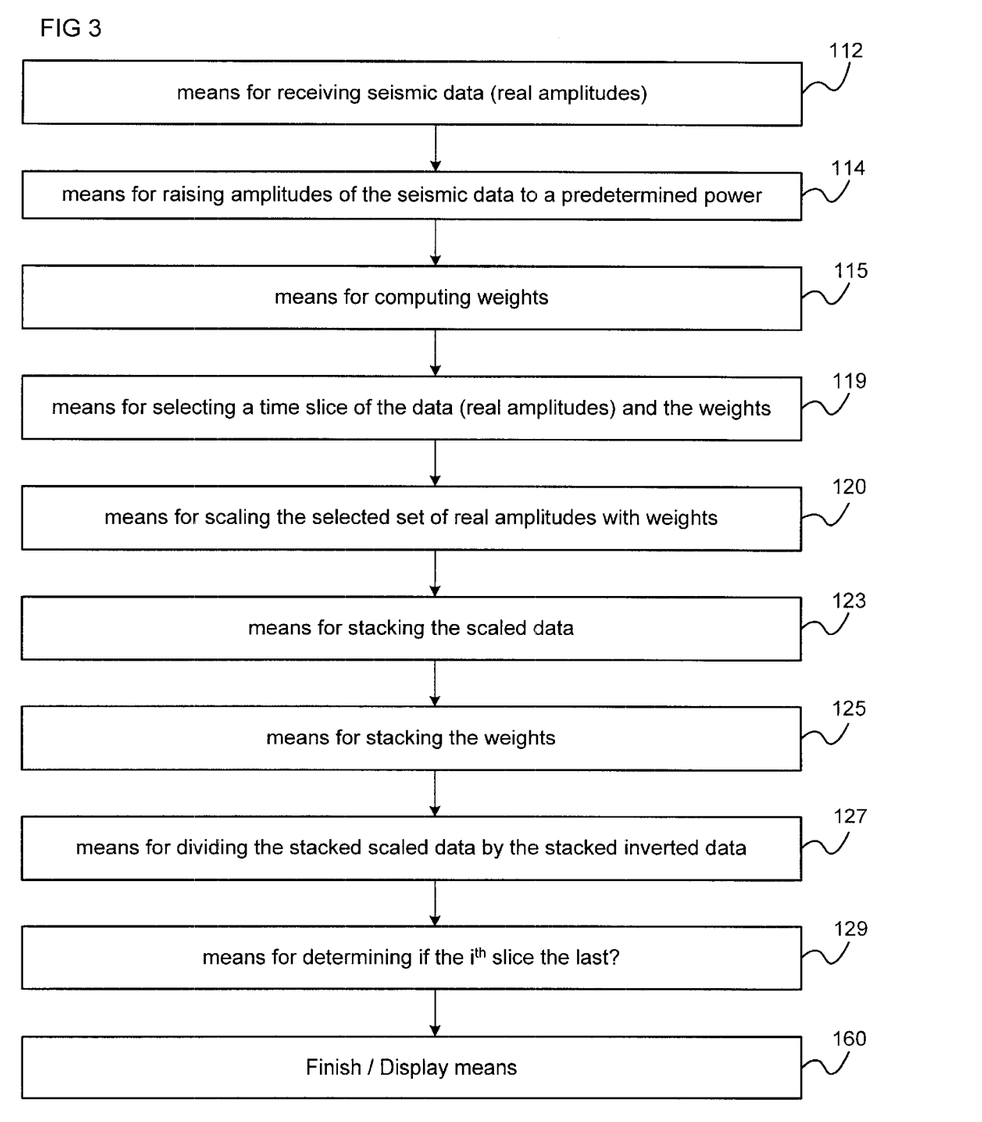
FIG. 3 is a block diagram of one embodiment of a system of the present invention.

Referring now to FIG. 3, a system of the present invention is illustrated in block form. In one embodiment of the present invention, various aspects of the system are in the form of a computer. In alternate embodiments, various aspects will be digital or analog as will occur to one of ordinary skill in the art. Block 112 represents means for receiving. The means for receiving 112 obtains seismic data. In various embodiments of the present invention, means for receiving 112 is a digital computer capable of reading seismic traces from magnetic tape, a computer capable of storing seismic data, or any other means for receiving data that would occur to one of ordinary skill in the art.

In an even further embodiment, block 114 represents a means for raising amplitudes. This means for raising the real amplitude traces 114 converts the data to the $n^{th}$ power by raising the amplitudes of the real traces to the $n^{th}$ power. In various embodiments, means for raising amplitudes 114 is a digital computer, software running on a digital computer, calculator, analog machine, or any other means capable of raising an amplitude to a power that will occur to one of ordinary skill in the art.

In an even further embodiment, means for computing weights 115 is provided. In some embodiments, the means for computing weights 115 further comprises a means for inverting the $n^{th}$ power trace values to obtain weights w. In various embodiments, the means for computing weights 115 is a digital computer, software running on a computer, an analog machine, or any other means that will occur to one of ordinary skill in the art. In alternate embodiments, weights are supplied manually.

In alternate embodiments, a means for smoothing smoothes the weights. In various embodiments, the means for smoothing smoothes the weights with a Boxcar, Bartlett, Gaussian, or other filter that will occur to those of skill in the art. In some embodiments, this filter has a predefined length. Of course, in some embodiments, such smoothing is not needed. In even further embodiments, means for smoothing is a digital computer, software running on a computer, an analog machine, or any other means for smoothing data which will occur to one of ordinary skill in the art.

In an even further embodiment, block 119 represents a means for selecting. A means for selecting 119 selects a time slice and determines the amplitudes of the traces. In various embodiments, means for selecting 119 is a digital computer, software running on a computer, an analog machine, and any other means for selecting 119 which will occur to one of ordinary skill in the art.

In an even further embodiment, block 120 represents a means for scaling. In various embodiments, means for scaling 120 is a digital computer, software running on a computer, an analog machine, and any other means for scaling the amplitudes of seismic data.

In an even further embodiment, block 123, 125 represents a means for stacking. A means for stacking 123, 125 is provided which stacks the real amplitudes and stacks the weights. In various embodiments, the means for stacking 123, 125 is a digital computer, software running on a computer, an analog machine, or any other means for stacking that will occur to one of ordinary skill in the art.

In an even further embodiment, block 127 represents a means for dividing. In various embodiments, means for dividing 127 is a digital computer, software running on a computer, an analog machine, or any other means that will occur to one of ordinary skill in the art.

In an even further embodiment, a means for determining 129 reviews the processed data to determine if the time slice being considered is the $i^{th}$ time slice or the last time slice. If it is the last time slice, the data may be transferred to a display means 160 for displaying the processed data. In various embodiments, means for determining 129 is a digital computer, software running on a computer, an analog machine, or any other means that would occur to one of ordinary skill in the art. In alternate embodiments, means for determining 129 manually compares the time of the time slice to the maximum recording time.

Means for displaying 160 comprises a device such as a monitor or a printout or any other means for displaying 160 that will occur to those of ordinary skill in the art. Of course, the data may be transferred to other methods for further processing as will occur to those of ordinary skill in the art. In various embodiments, means for displaying is a printed seismograph, or any other means for displaying that will occur to those of ordinary skill in the art. If the time slice is not the last time slice, the means for comparing returns the data to means for selecting 119. Means for selecting 119 selects a new time slice, and amplitudes of scaled and weight data are stacked and saved.

Figure 4A:
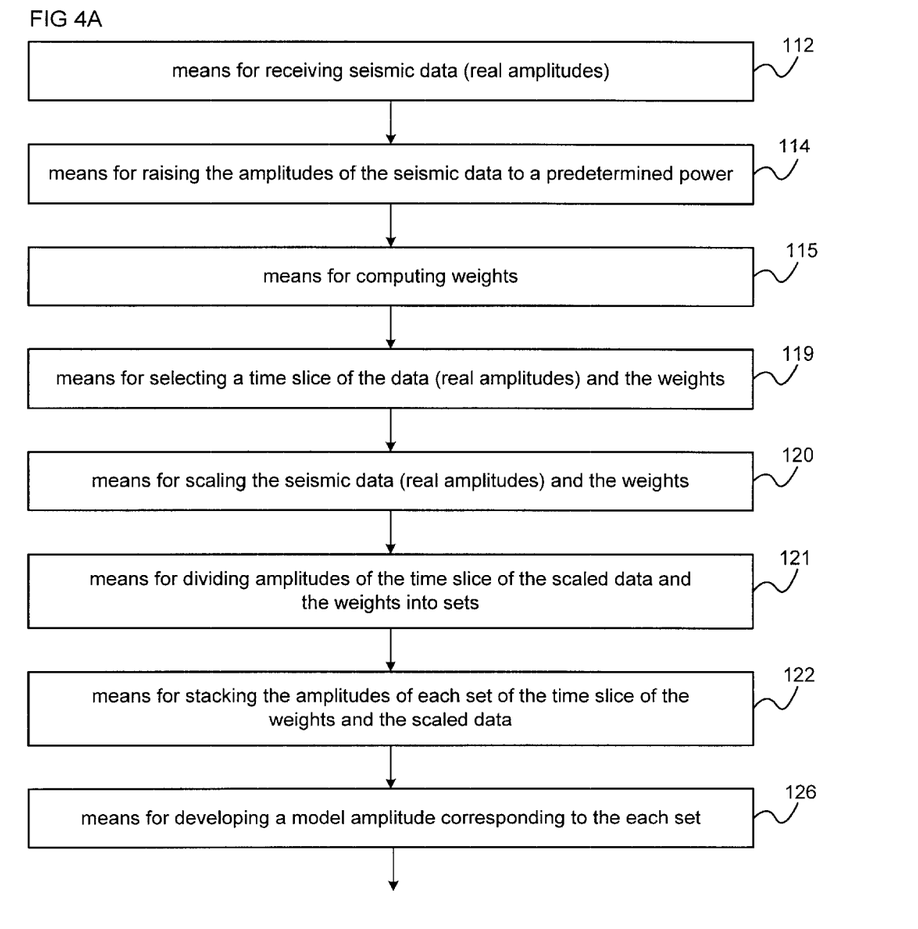
FIGS. 4A, 4B, and 4C are a block diagram of another embodiment of a system of the present invention.
Figure 4B:
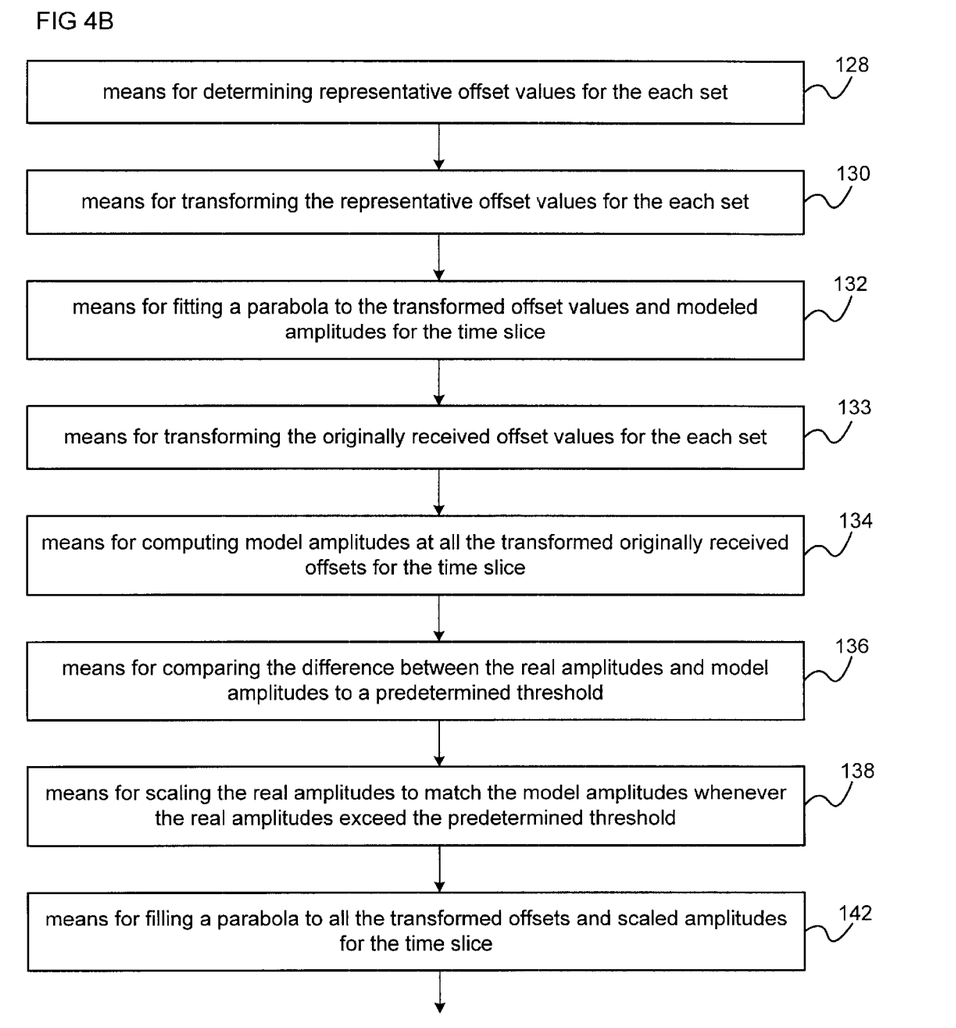
Figure 4C:
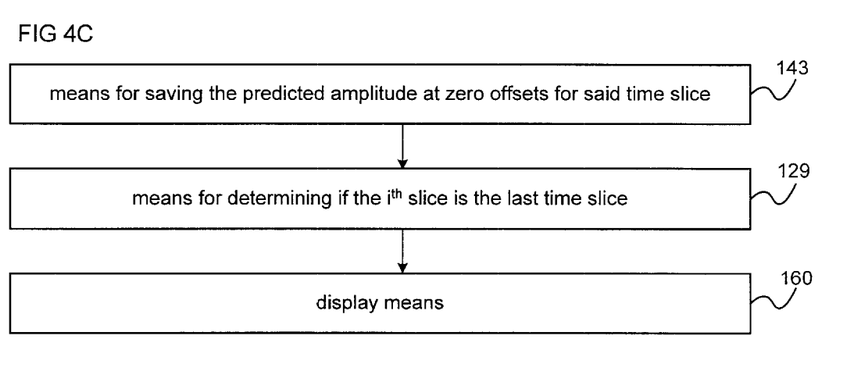

Referring now to FIG. 4, a system for effecting various embodiments of the method of the present invention is illustrated in block form. In one embodiment, means for receiving 112 receives seismic data. In one embodiment, means for receiving 112 may be a part of a digital computer, such as a tape reader, or the like which can read data in electronic form and establish values to this data. Of course in alternate embodiments, means for receiving 112 is a digital computer, software running on a computer, an analog machine, or any other means for receiving seismic data that will occur to one of ordinary skill in the art.

In a further embodiment, means for raising amplitudes 114 provides a means for raising the amplitudes to a predetermined $n^{th}$ power. In various embodiments means for raising amplitudes 114 is a digital computer, software running on a computer, an analog machine, or any other means for raising an amplitude to a $n^{th}$ power that will occur to those of ordinary skill in the art. The means for raising 114 converts the input real amplitude traces to $n^{th}$ power values.

In an even further embodiment, the means for creating weights 115 is provided. In a further embodiment, means for computing weights inverts the $n^{th}$ power traces to obtain the weights w. In various embodiments, means for computing weights 115 is a digital computer, software running on a computer, an analog machine, or any other means for computing weights or inverting seismic data that will occur to one of ordinary skill in the art.

In alternate embodiments, a means for smoothing is provided. Means for smoothing smoothes the $n^{th}$ power values or weights. In alternate embodiments, means for smoothing is a Boxcar, Bartlett, or Gaussian filter. This filter will have a predefined length in some embodiments. Of course other means for smoothing such as a digital computer, software running on a computer, an analog machine, will also occur to one of ordinary skill in the art as well as many others.

In a further embodiment, means for selecting 119 selects a time slice and determines the amplitudes. In various embodiments, means for selecting 119 is a digital computer, software running on a computer, an analog machine, or any other means for selecting that will occur to one of ordinary skill in the art.

In a further embodiment, means for scaling 120 scales amplitudes. In various embodiments, means for scaling 120 scales real amplitudes, or any other data that will occur to those of ordinary skill in the art. In various embodiments, means for scaling 120 is a digital computer, software running on a computer, an analog machine, or any other means for selecting that will occur to one of ordinary skill in the art.

In an even further embodiment, a means for dividing amplitudes into sets 121 divides the amplitudes of the time slice into sets. Means 121 divides both the weights and the scaled data into sets. The means for dividing into sets 121 is a digital computer, software running on a computer, an analog machine, or any other means that will occur to those of ordinary skill in the art. In a further alternate embodiment, the sets are divided manually.

In an even further embodiment, a means for stacking 122 stacks the amplitudes of each set of the time slice of the weights and scaled data. In alternate embodiments, means for stacking 122 will stack the data in a digital computer, software running on a computer, an analog machine, or any other method that will occur to those of ordinary skill in the art.

In an even further embodiment, a means for developing a model amplitude 126 develops model amplitudes corresponding to each set. In one example embodiment, the means for developing 126 centers each of the three weighted stacks at the middle of the minimum and maximum offset included in each set of amplitudes. The results of the means for developing 126 are three model amplitudes for each time slice. In various embodiments, the means for developing 126 is a digital computer, software running on a computer, an analog machine, or any other means 126 of developing model amplitudes that will occur to one of ordinary skill in the art.

A means for determining the center of offset values 128 determines representative offset values. The three model amplitudes, for example, $s_1$, $s_2$ and $s_3$, will have three corresponding representative offsets, $x_1$, $x_2$ and $x_3$, respectively. For example, in one embodiment, each offset value is the average of the minimum and maximum offsets in the selected set.

In a further embodiment, a means for transforming the representative offset values 130, transforms the representative offsets to the sine square of the angle of incidence domain. In various embodiments, means for transforming 130 is a digital computer, software running on a computer, an analog machine, or any other means that will occur to those of ordinary skill in the art.

In an even further embodiment, a means for fitting a parabola 132 fits a parabola to the transformed representative offset values for the selected data sets. In various embodiments, means for fitting a parabola 132 is a digital computer, software running on a computer, an analog machine, or any other means that will occur to those of ordinary skill in the art.

In a further embodiment, a means for transforming 133 the originally received offset values of the received seismic data, transforms the originally received offsets to the sine square of the angle of incidence domain. In various embodiments, means for transforming 133 is a digital computer, software running on a computer, an analog machine, or any other means that will occur to those of ordinary skill in the art.

In an even further embodiment, a means for computing model amplitudes 134 is provided. Model amplitudes are computed at all the transformed originally received offsets for the time slice. In various embodiments, the means for computing 134 is a digital computer, software running on a computer, an analog machine, or any other means for computing an amplitude that will occur to one of ordinary skill in the art.

In an even further embodiment, means for comparing 136 the difference between the model amplitudes and the real or raw amplitudes is provided. Means 136 compares this difference with a a predetermined threshold value. In various embodiments, the means for comparing 136 is a digital computer, software running on a computer, an analog machine, or any other means for comparing that will occur to one of ordinary skill in the art.

In an even further embodiment, means for scaling 138 is provided. If the difference exceeds such threshold value, then the current real amplitude is scaled to match that of the modeled amplitude. This creates edited amplitudes. In various embodiments, means for scaling 138 is a digital computer, software running on a computer, an analog machine, or any other means that will occur to one of ordinary skill in the art.

In an even further embodiment, means for fitting a parabola to all the transformed originally received offsets 142 performs another parabolic fitting to the scaled amplitudes. The result will be a new set of coefficients which are denominated $b'_0$, $b'_1$, and $b'_2$. $b'_0$ is then the current predicted amplitude at zero offset with no AGI effect. It is saved by a memory saving means 143. In various embodiments, means for saving 143 is a digital computer, software running on a computer, an analog machine, or any other means that will occur to one of ordinary skill in the art.

In a further embodiment, means for determining 129 reviews the processed data to determine if the time slice being considered is the $i^{th}$ time slice or the last time slice. If the time slice is not the last time slice, the system returns to means for selecting 119 and a new time slice is selected. If it is the last time slice, the data is displayed by display means 160. In alternate embodiments, means for displaying 160 is a digital computer, software running on a computer, an analog machine, or any other means that will occur to those of ordinary skill in the art.

While example embodiments of the present invention have been illustrated and described, it will be appreciated that numerous changes and modifications will occur to those skilled in the art, and it is intended in the appended claims to cover all those changes and modifications which fall within the true spirit and scope of the present invention.

I claim:

1. A method for attenuation of acquisition geometry imprint in seismic data comprising:
   raising amplitudes of said seismic data to a predetermined power;
   computing weights;
   selecting a time slice of the seismic data and said weights;
   scaling the seismic data with the weights;
   stacking the scaled data;
   stacking the weights; and
   dividing the stacked scaled data by the stacked weights.

2. The method of claim 1, wherein said computing weights further comprises inverting the seismic data.

3. The method of claim 1, wherein said scaling, stacking, and dividing further comprises stacking with an inverse $n^{th}$ power weighted stack.

4. The method of claim 3, wherein said inverse $n^{th}$ power weighted stack comprises:

$$S_w = \frac{\sum_i a_i \cdot w_i}{\sum_i w_i}; \quad w_i = \frac{1}{a_i^n}; \quad i = 1, 2, \ldots m$$

wherein:
   m comprises a number of offsets;
   a comprises an input real amplitudes from said receiving seismic data;
   w comprises a weight;
   i comprises a sample; and
   n comprises a predetermined power.

5. The method of claim 1, further comprising smoothing said weights.

6. The method of claim 5, wherein said smoothing further comprises filtering.

7. The method of claim 6, wherein said filtering further comprises filtering with a Boxcar filter.

8. The method of claim 6, wherein said filtering further comprises filtering with a Bartlett filter.

9. The method of claim 6, wherein said filtering further comprises filtering with a Gaussian filter.

10. The method of claim 1, wherein said raising amplitudes further comprises squaring said amplitudes.

11. The method of claim 1, wherein said receiving further comprises obtaining common midpoint gathers.

12. The method of claim 1, further comprising displaying the seismic data.

13. The method of claim 12, wherein said displaying further comprises displaying data on a monitor.

14. The method of claim 12, wherein said displaying further comprises printing a seismogram.

15. The method of claim 1, further comprising determining if the time slice selected is the last time slice.

16. A method for attenuation of acquisition geometry imprint in seismic data comprising:
    receiving seismic data;
    raising amplitudes of said seismic data to a predetermined power;
    computing weights;
    selecting a time slice of said seismic data and said weights;
    scaling the seismic data with the weights;
    dividing amplitudes of said time slice of the scaled data and the weights into sets;
    stacking the amplitudes of each set of the scaled data and the weights;
    developing a model amplitude corresponding to each set;
    determining representative offset values for each set;
    transforming the representative offset values for each set;
    fitting a parabola to the transformed representative offset values and modeled amplitudes for each time slice;
    transforming originally received offsets of the received seismic data;
    computing model amplitudes at the transformed originally received offsets;
    comparing the difference between the seismic data and the model amplitudes at the transformed originally received offsets to a predetermined threshold;
    scaling the seismic data to match said model amplitudes whenever amplitudes of the seismic data exceed said predetermined threshold creating edited real amplitudes; and
    fitting a parabola to said transformed originally received offsets and the edited amplitudes.

17. The method of claim 16, further comprising saving predicted amplitude at zero offset.

18. The method of claim 16, wherein said developing a model amplitude corresponding to each set further comprises dividing the stacked scaled data by the stacked weights.

19. The method of claim 18, wherein said developing further comprises stacking with an inverse $n^{th}$ power weighted stack.

20. The method of claim 19, wherein said inverse $n^{th}$ power weighted stack comprises:

$$S_w = \frac{\sum_i a_i \cdot w_i}{\sum_i w_i}; w_i = \frac{1}{a_i^n}; i = 1, 2, \ldots m$$

wherein:
m comprises a number of offsets;
a comprises an input real amplitudes from said receiving seismic data;
w comprises a weight;
i comprises a sample; and
n comprises a predetermined power.

21. The method of claim 16, further comprising displaying the seismic data.

22. The method of claim 21, wherein said displaying further comprises displaying said data on a monitor.

23. The method of claim 21, wherein said displaying further comprises printing a seismogram.

24. The method of claim 16, wherein said receiving further comprises obtaining common midpoint gathers.

25. The method of claim 16, wherein said raising amplitudes of said seismic data to a predetermined power further comprises raising said amplitudes to the first power.

26. The method of claim 16, wherein said raising amplitudes of said seismic data to a predetermined power further comprises squaring said amplitudes.

27. The method of claim 16, wherein said transforming said representative offset values further comprises transforming said offset values to a sine square of the angle of incidence domain.

28. The method of claim 27, wherein said transforming said representative offset values to a sine square of the angle of incidence domain further comprises:

$$\sin^2(\theta) = \sin^2\left[\arctan\left(\frac{x}{t_0 \cdot V}\right)\right]$$

wherein:
x comprises an offset value;
$t_0$ comprises a normal incidence travel time;
V comprises a velocity; and
θ comprises an angle of incidence.

29. The method of claim 16, wherein said transforming said originally received offset values further comprises transforming said offset values to a sine square of the angle of incidence domain.

30. The method of claim 29, wherein said transforming said originally received offset values to a sine square of the angle of incidence domain further comprises:

$$\sin^2(\theta) = \sin^2\left[\arctan\left(\frac{x}{t_0 \cdot V}\right)\right]$$

wherein:
x comprises an offset value;
$t_0$ comprises a normal incidence travel time;
V comprises a velocity; and
θ comprises an angle of incidence.

31. The method of claim 16, wherein said fitting a parabola further comprises:

$$s(\theta) = b_0 + b_1 \sin^2 \theta + b_2 \sin^4 \theta;$$

wherein:
θ comprises an angle of incidence; and
$b_0$, $b_1$, and $b_2$ comprise coefficients.

32. The method of claim 27, wherein said fitting a parabola further comprises:

$$s'(\theta) = b'_0 + b'_1 \sin^2 \theta + b'_2 \sin^4 \theta;$$

wherein:
θ comprises an angle of incidence; and
$b'_0$, $b'_1$, and $b'_2$ comprise coefficients.

33. The method of claim 29, wherein said fitting a parabola further comprises:

$$s'(\theta) = b'_0 + b'_1 \sin^2 \theta + b'_2 \sin^4 \theta;$$

wherein:
θ comprises an angle of incidence; and
$b'_0$, $b'_1$, and $b'_2$ comprise coefficients.

34. The method of claim 16, wherein said computing weights further comprises inverting the seismic data.

35. The method of claim 16, further comprising smoothing the weights.

36. The method of claim 35, wherein said smoothing further comprises filtering.

37. The method of claim 36, wherein said filtering comprises filtering with a Boxcar filter.

38. The method of claim 36, wherein said filtering comprises filtering with a Bartlett filter.

39. The method of claim 36, wherein said filtering comprises filtering with a Gaussian filter.

40. The method of claim 16, wherein said saving the scaled amplitudes further comprises saving the scaled amplitudes for all offsets at the time slice.

41. The method of claim 16, further comprising determining if the time slice selected is the last time slice.

42. A system for attenuation of acquisition geometry imprint in seismic data comprising:
means for raising amplitudes of said seismic data to a predetermined power;
means for computing weights;
means for selecting a time slice of the seismic data and said weights;
means for scaling the received seismic data with the weights;
means for stacking the scaled data;
means for stacking the weights; and
means for dividing the stacked scaled data by the stacked weights.

43. The system of claim 42, wherein said means for computing weights further comprises means for inverting the seismic data.

44. The system of claim 42, wherein said means for scaling, means for stacking, and means for dividing further comprises means for stacking with an inverse $n^{th}$ power weighted stack.

45. The system of claim 42, further comprising means for smoothing said weights.

46. The system of claim 45, wherein said means for smoothing further comprises a filter.

47. The system of claim 46, wherein said filter further comprises a Boxcar filter.

48. The system of claim 46, wherein said filter further comprises filtering with a Bartlett filter.

49. The system of claim 46, wherein said filtering further comprises a Gaussian filter.

50. The system of claim 42, wherein said means for raising amplitudes further comprises means for squaring said amplitudes.

51. The system of claim 42, wherein said means for receiving further comprises means for obtaining common midpoint gathers.

52. The system of claim 42, further comprising means for displaying the seismic data.

53. The system of claim 52, wherein said means for displaying further comprises a monitor.

54. The system of claim 52, wherein said means for displaying further comprises a seismogram.

55. The system of claim 52, further comprising means for determining if the time slice selected is the last time slice.

56. A system for attenuation of acquisition geometry imprint in seismic data comprising:
means for receiving seismic data;
means for raising amplitudes of said seismic data to a predetermined power;
means for computing weights;
means for selecting a time slice of said seismic data and said weights;
means for scaling the seismic data with the weights;
means for dividing amplitudes of said time slice of the scaled data and the weights into sets;
means for stacking the amplitudes of each set of the scaled data and the weights;
means for developing a model amplitude corresponding to each set;
means for determining representative offset values for each set;
means for transforming the representative offset values for each set;
means for fitting a parabola to the transformed representative offset values and modeled amplitudes for each time slice;
means for transforming originally received offsets of the received seismic data;
means for computing model amplitudes at the transformed originally received offsets;
means for comparing the difference between the seismic data and the model amplitudes at the transformed originally received offsets to a predetermined threshold;
means for scaling the seismic data to match said model amplitudes whenever amplitudes of seismic data exceed said predetermined threshold creating edited real amplitudes; and
means for fitting a parabola to said transformed originally received offsets and the edited amplitudes.

57. The system of claim 56, further comprising means for means for saving predicted amplitude at zero offset.

58. The system of claim 56, wherein said means for developing a model amplitude corresponding to each set further comprises means for dividing the stacked scaled data by the stacked weights.

59. The system of claim 58, wherein said means for developing further comprises means for stacking with an inverse $n^{th}$ power weighted stack.

60. The system of claim 56, further comprising means for displaying the seismic data.

61. The system of claim 60, wherein said means for displaying further comprises means for visually reviewing said data.

62. The system of claim 60, wherein said means for displaying further comprises means for printing a seismogram.

63. The system of claim 60, wherein said means for receiving further comprises means for obtaining common midpoint gathers.

64. The system of claim 56, wherein said means for raising amplitudes of said seismic data to a predetermined power further comprises means for squaring said amplitudes.

65. The system of claim 56, wherein said means for transforming said representative offset values further comprises means for transforming said representative offset values to a sine square of the angle of incidence domain.

66. The system of claim 56, wherein said means for transforming said originally received offset values further comprises means for transforming said originally received offset values to a sine square of the angle of incidence domain.

67. The system of claim 56, wherein said means for computing weights further comprises means for inverting the seismic data.

68. The system of claim 56, further comprising means for smoothing the weights.

69. The system of claim 68, wherein said means for smoothing further comprises a filter.

70. The system of claim 69, wherein said filter comprises a Boxcar filter.

71. The system of claim 69, wherein said filter comprises a Bartlett filter.

72. The system of claim 69, wherein said filter comprises a Gaussian filter.

73. The system of claim 56, wherein said means for saving the scaled amplitudes further comprises means for saving the scaled amplitudes for all offsets at the time slice.

74. The system of claim 56, further comprising means for determining if the time slice selected is the last time slice.

* * * * *